United States Patent [19]
Dickinson

[11] Patent Number: 5,709,008
[45] Date of Patent: Jan. 20, 1998

[54] STORAGE CONTAINER WHEEL ASSEMBLY

[75] Inventor: Thomas Dickinson, St. Louis, Mo.

[73] Assignee: Contico International, Inc., St. Louis, Mo.

[21] Appl. No.: 378,177

[22] Filed: Jan. 25, 1995

Related U.S. Application Data

[62] Division of Ser. No. 176,860, Jan. 3, 1994, Pat. No. 5,564,805.

[51] Int. Cl.⁶ .......................... B60B 33/00; A47B 91/00
[52] U.S. Cl. ............................................ 16/45; 16/29
[58] Field of Search ........................ 16/45, 18 R, 29, 16/30, 31 R, 31 A; 220/4.27; 206/508, 511, 512

[56] References Cited

U.S. PATENT DOCUMENTS

| | | | |
|---|---|---|---|
| 623,157 | 4/1899 | Hunter | 16/29 |
| 1,999,162 | 4/1935 | Wolters et al. | |
| 3,163,268 | 12/1964 | Leavell | |
| 3,379,482 | 4/1968 | Baggott | |
| 3,498,689 | 3/1970 | Hansen | |
| 4,463,840 | 8/1984 | Seynhaeve | 16/29 |
| 4,530,543 | 7/1985 | Keane | 16/45 |
| 4,707,881 | 11/1987 | Van Hoye | 16/29 |
| 4,839,938 | 6/1989 | Coggin et al. | 16/45 |
| 5,136,751 | 8/1992 | Coyne et al. | 16/29 |

OTHER PUBLICATIONS

Inlock, Ingenious Lock-System Brochure, Tenma Platech & House Wares.

*Primary Examiner*—Chuck Y. Mah
*Attorney, Agent, or Firm*—Howell & Haferkamp, L.C.

[57] ABSTRACT

A plastic storage container with wheel assemblies having an axle pin rotatably fixed to the container, a secure lid latch having a double-wall construction to ease opening and closing as well as an offset hinge to allow protection of the latch during distribution, and an internal tray having dependent flanges which mate to the storage container to prevent the walls of the storage container from splaying.

22 Claims, 8 Drawing Sheets

STORAGE CONTAINER WHEEL ASSEMBLY

This application is a divisional application of U.S. patent application Ser. No. 08/176,860, filed Jan. 3, 1994, entitled "STORAGE CONTAINER WITH WHEELS", now U.S. Pat. No. 5,564,805.

BACKGROUND OF THE INVENTION

This invention is directed to the field of storage containers. In particular, the invention is directed to a storage container with integral wheel assemblies, secure lid latches, and an internal tray.

Containers for storage of miscellaneous articles are in the prior art and with the reduction in cost of materials and increase in desire to organize belongings, storage containers are ever-increasing in popularity. The storage container of the present invention has several features which make the container particularly desirable.

Once containers are filled with articles, they may become heavy which makes personal transport more difficult. In addition, containers may be stored in locations which prevent convenient lifting. For example, containers stored underneath a bed are not easily removed by lifting. In the past, the containers had to be dragged, thereby scuffing the container and/or the floor. When the containers were weighted down by being filled with articles, friction between the container and floor made dragging the container difficult.

One aspect of the present invention is wheel assemblies for use in combination with storage containers. In addition to overcoming the problems of the prior art mentioned above, the wheel assemblies are durable, lightweight, and inexpensive to manufacture. In the preferred embodiment of the wheel assembly, the wheel well is integral with the storage box and may be made of the durable and inexpensive materials common in the storage container industry.

Many different lids and latches are present in the prior art. The desirable characteristics of these latches are that they securely fasten the lid to the container and that they are relatively inexpensive. The latch of this invention has these desirable characteristics and is built into the handle of the container. As will be explained below, the latch contains a double-wall feature which makes the latch easier to operate and more secure. Additionally, the latch is designed to fold out of the way when the containers are nested during initial distribution. This feature prevents handling damage to the latches during distribution.

Many prior art storage containers have incorporated separate internal trays for convenient storage of smaller items and for further organization of the contents. These trays typically are suspended from flanges by the walls of the container. In the past when trays were suspended, the walls of the container had to be stiffened to prevent the walls from splaying during use. The suspension means of the subject storage container has features to prevent the walls from splaying. These features reduce the stiffness required in the wall to support the tray and thus reduces the required material. The reduction in material has the advantages of reduced cost and is more environmentally friendly.

The present invention overcomes the disadvantages inherent the prior art storage containers and storage container wheel assemblies by providing a unique wheel assembly, a damage-resistant latch and a splay-resistant tray.

SUMMARY OF THE INVENTION

The present invention is generally comprised of a storage container with integral wheel wells, secure lid latches, and an internal tray.

The wheel assemblies of the present invention are generally comprised of wheel wells, rollers, and axle pins. Round holes extend through the axes of the rollers so that the rollers may be rotatably mounted on the axle pins. In the preferred embodiment, the wheel wells are comprised of two panels integrally formed into the bottom of the storage container. The panels have holes through them which are shaped like the axle pin cross-sections; the hole in the one panel is round so that it provides radial support for the axle pin, and the hole in the other panel is substantially rectangular as is the mating end of the axle pin so as to provide radial support and prevent rotation of the pin. Thus, the axle pin does not rotate relative to the container, but the roller rotates relative to the axle pin. This design reduces wear between the container and pin. In the preferred embodiment, the rectangular hole is obliquely oriented to positively center the axle pin within the wheel well and reduce rattling of the components The square end of the axle pin is forked to permit compression of the pin and has hooks which keep the pin in place in the wheel wells. Compression of the fork permits assembly of the wheel assemblies. In the preferred embodiment, a cover is molded into the container to enclose the hooks while assembled to prevent inadvertent disassembly and for aesthetics.

The latches of the present invention are generally comprised of a handle latch hinged to the container and a mating ridge on the lid. The latch incorporates a double-wall locking mechanism which holds the latch securely in place, yet permits easy opening and closing of the latch. The double-wall construction consists of cantilevered outer and inner plates as shown in FIGS. 9 and 10. The inner plate has the locking mechanism in the form of a detent. A user grips the outer, cover plate to open the latch. Thus, the inner plate comprising the detent is flexible relative to the cover plate. The user does not have to be cognizant of the motion required of the detent in order to operate the latch because the detent is free to displace as needed during opening and closing.

The current invention incorporates a tray having a flange about the periphery and dependent flanges extending vertically down from the flange on at least two opposing, sides of the tray. These dependent flanges mate with tracks and rails built into the sides of the storage container so as to allow the tray to freely slide and be removed from the storage container, yet the sides of the storage container are not free to move relative to the tray. Without the dependent flange and rail feature, the sides of the container may flex relative to the tray, thereby allowing the sides to splay and the tray to drop into the container. However, with the feature, splaying is prevented.

While the principal advantages and features of the present invention have been briefly described above, a greater understanding of the novel and unique features of the invention may be obtained by referring to the drawings and the description of the preferred embodiment which follow.

DETAILED DESCRIPTION OF THE PREFERRED EMBODIMENT

Figure 1:
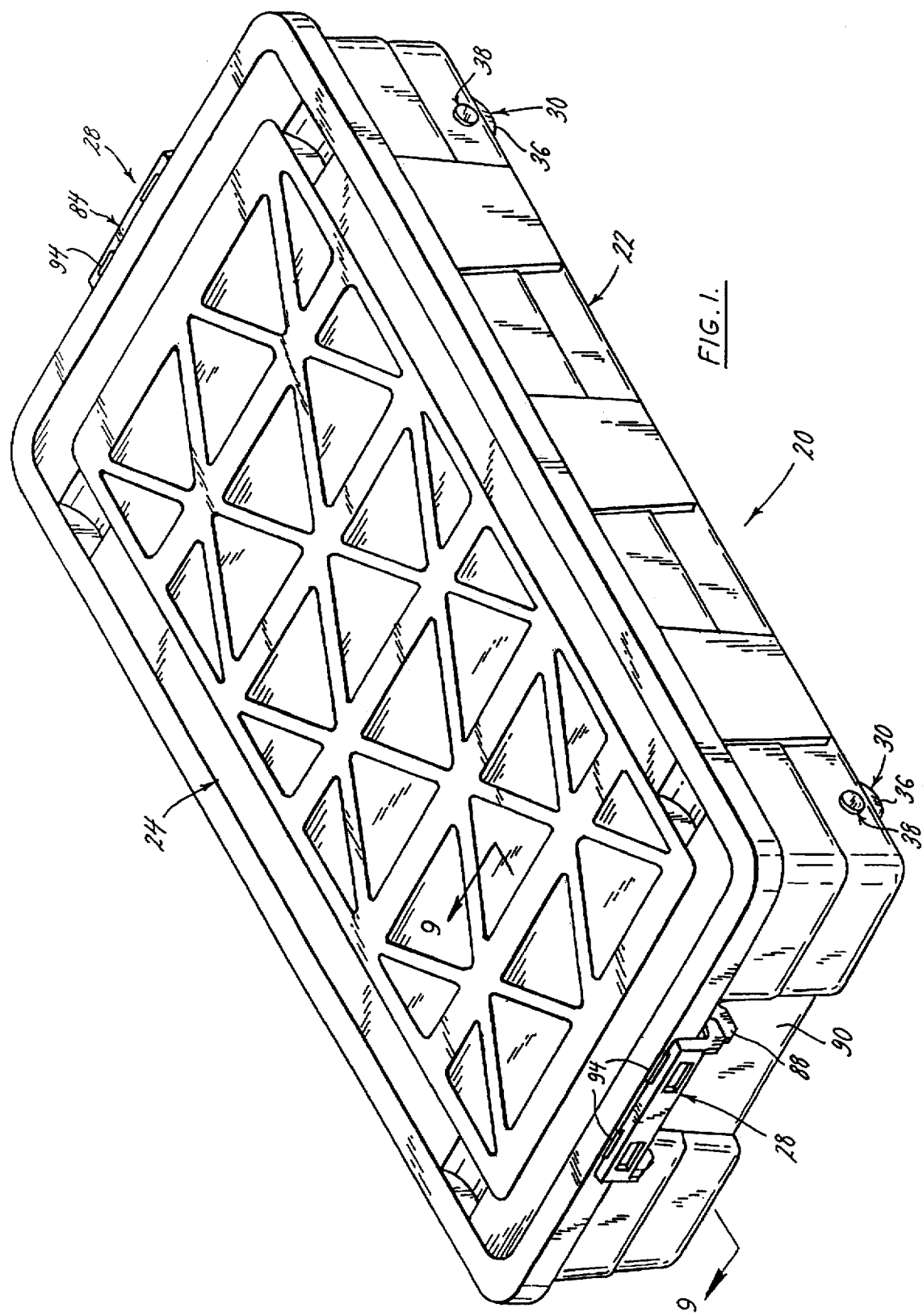
FIG. 1 is an orthographic view of a storage container of the present invention.
Figure 2:
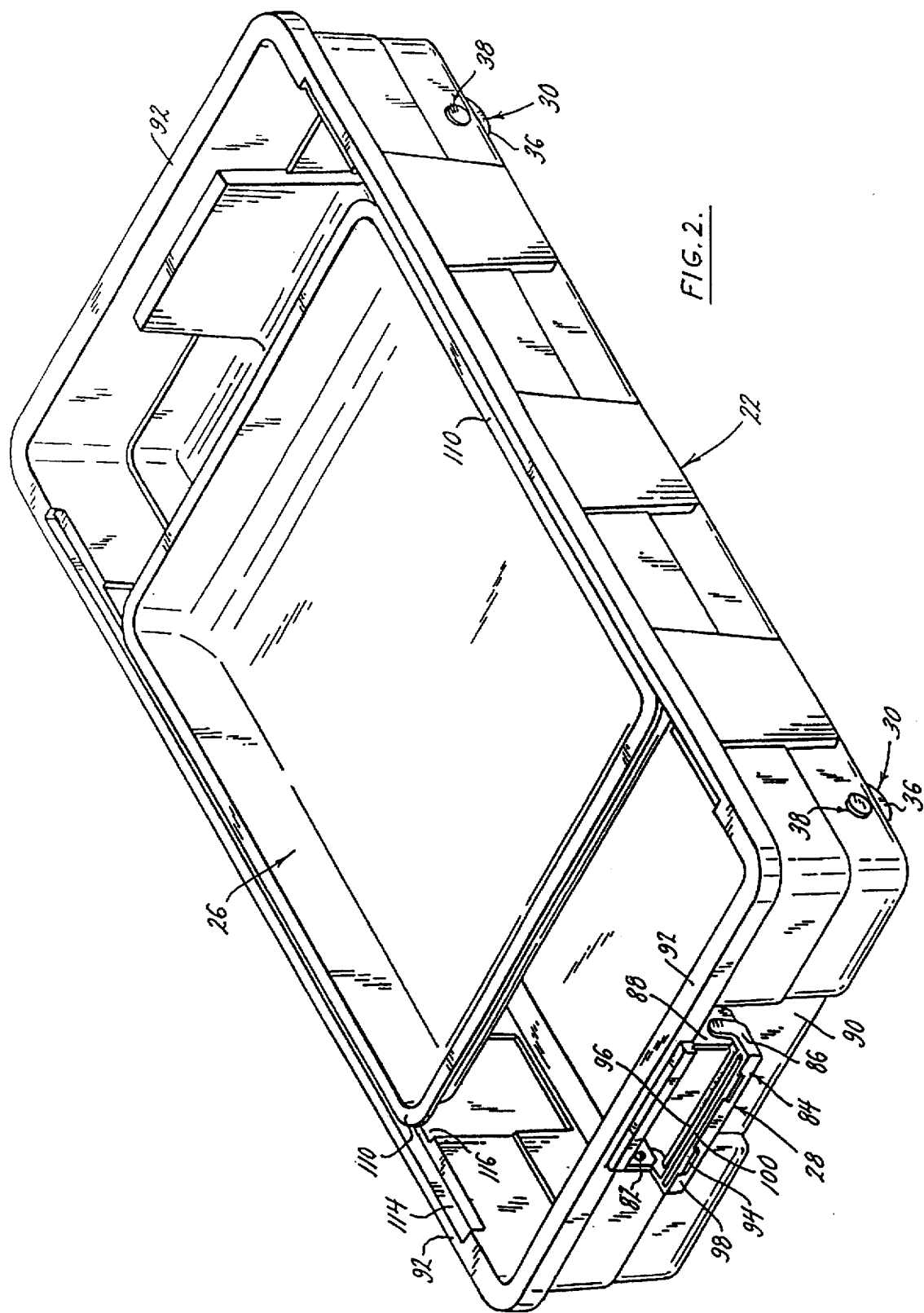
FIG. 2 is an orthographic view of a storage container showing details of the interior of the container.
Figure 3:
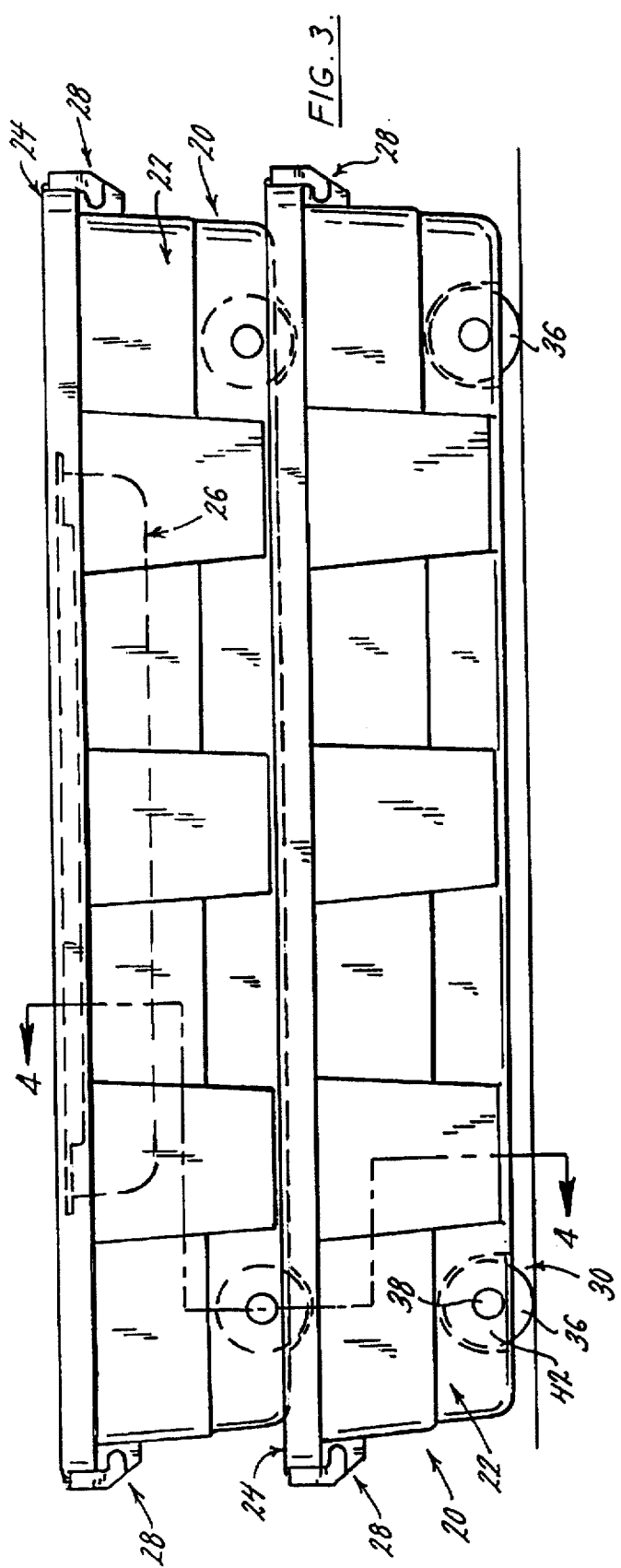
FIG. 3 is a front elevation view of two stacked storage containers.

The storage container 20 is generally comprised of an open-top box 22, a lid 24, a tray 26, latches 28, and wheel assemblies 30.

Figure 4:
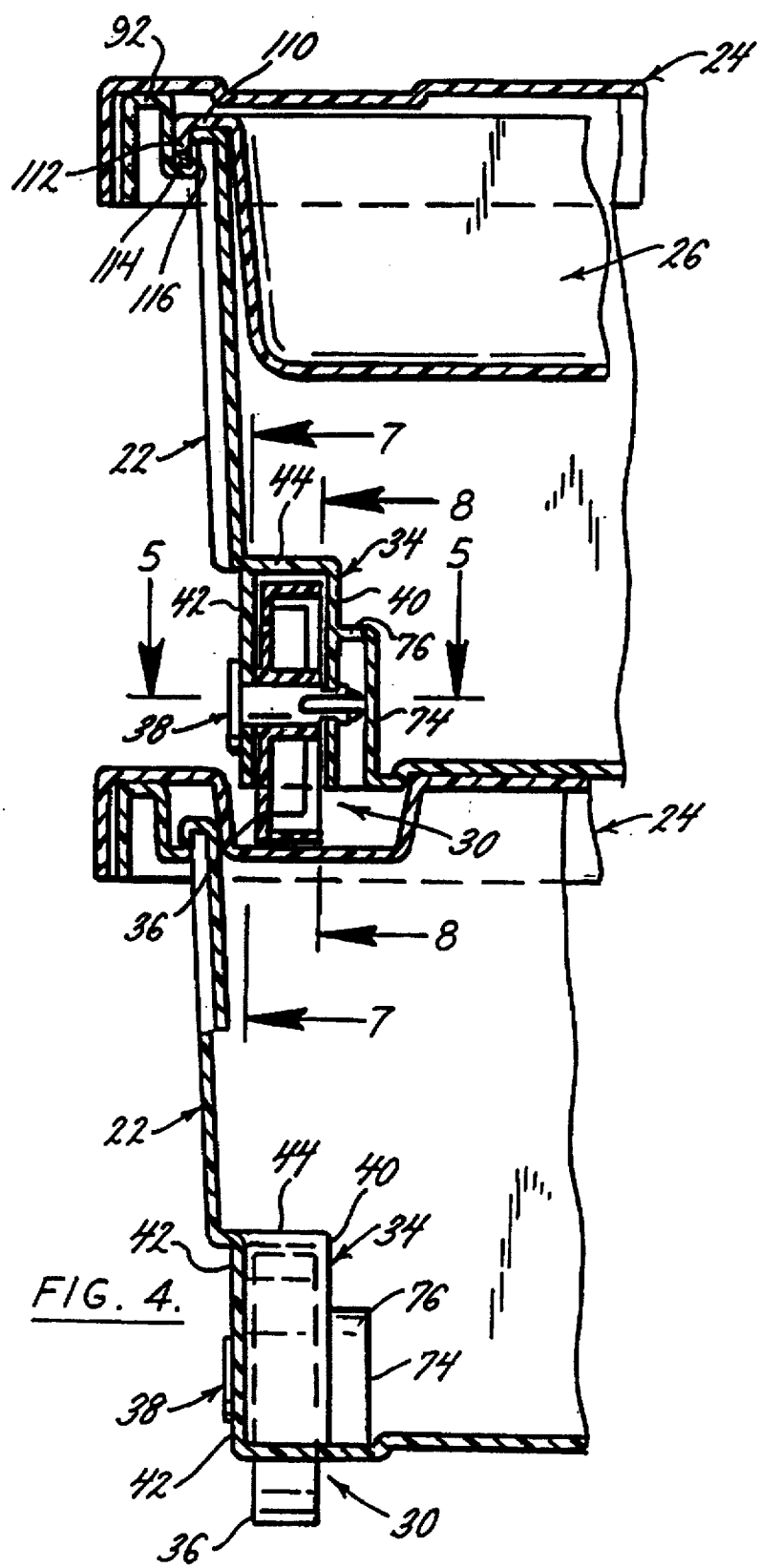
FIG. 4 is a section view of the stacked storage containers showing details of the wheel assembly taken at the plane of the line 4—4 of FIG. 3.

As best seen in FIG. 4, each wheel assembly 30 is generally comprised of a wheel well 34, a roller 36, and an axle pin 38. The wheel well 34 is formed by a first panel 40 spaced from a second panel 42 by an arcuate band 44. The first panel 40 has a square hole with rounded corners 48 located at the axis of the arc of the arcuate band 44. A circular hole 46 is located in the second panel 42 at the axis of the arc of the arcuate band 44. The function of the holes 46, 48 will be described hereinafter.

Figure 8:
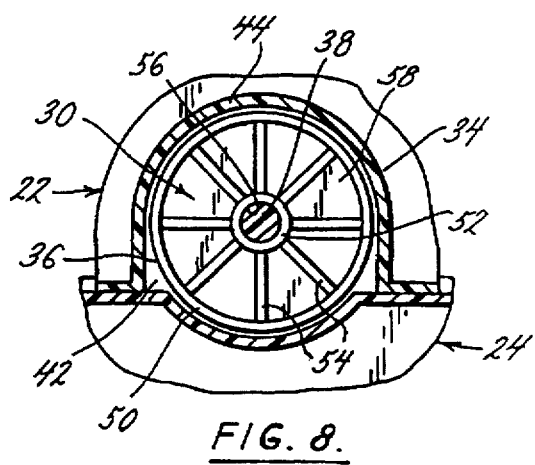
FIG. 8 is a section view of the wheel assembly taken at the plane of the line 8—8 of FIG. 4.

The roller 36 is comprised of a cylindrical rim 50 and cylindrical hub 52 spaced by a plurality of planar spokes 54 as depicted in FIG. 8. A circular aperture 56 extends through the hub 52, and a planar web 58 connects one end of the hub 52 to the adjacent end of the rim 50 so as to provide further stiffening to the spokes 54. The diameter of the roller 36 is smaller than the diameter of the arcuate band 44 of the wheel well 34 such that the roller 36 can freely rotate within the wheel well 34. Similarly, the length of the cylinder is less than the distance between the first and second panels 40, 42 of the wheel well 34 to permit free rotation of the rollers.

Figure 5:
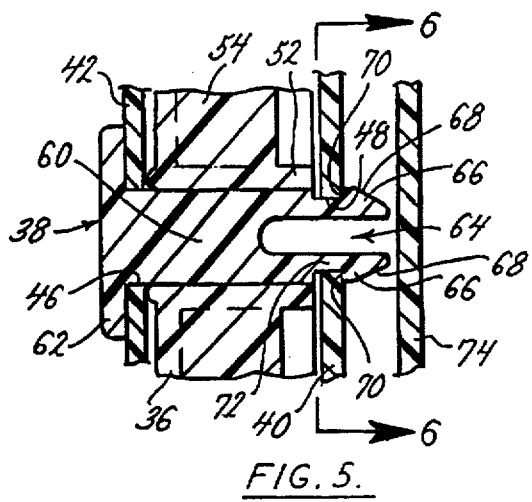
FIG. 5 is a section view of the axle pin taken at the plane of line 5—5 shown in FIG. 4.
Figure 6:
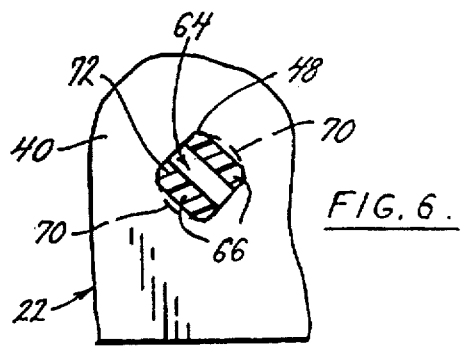
FIG. 6 is a section view of the axle pin taken at the plane of the line 6—6 of FIG. 5.
Figure 7:
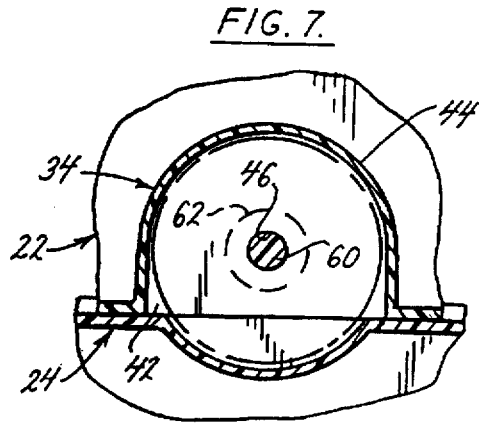
FIG. 7 is a section view of the wheel assembly taken at the plane of the line 7—7 of FIG. 4.

As shown in FIG. 5, the axle pin is comprised of a cylindrical axle section 60. A cap 62 is molded onto one end of the pin. At the other end of the axle section is a fork 64 with two opposite outward facing hooks 66 on the tines. The hooks 66 restrain the axle pin 38 from moving axially. The fork 64 may be compressed to permit assembly of the wheel assembly 32.

The hooks 66 are comprised of a lead-in chamfer 68, a retention lug 70 and a neck section 72. The dimensions of the chamfers 68 and lug 70 are such that when the fork 64 is compressed, the hooks 66 may be easily pushed through the square hole 48 in the first panel 40 of the wheel well 34. The neck section 72 has a square cross-section with rounded corners to prevent the axle pin 38 from spinning within the square hole 48 after assembly. Although in the first preferred embodiment the hole 48 and neck section 72 are both square, numerous polygonal shapes may be employed in alternate embodiments to prevent relative rotation between the pin and wheel well. The dimensions of the circular aperture 56 of the roller 36 and the axle section 60 of the axle pin 38 permit relative rotation between the component parts. The dimensions of the hooks 66 and square hole 48 permit small forces for ease of assembly, yet retain the axle pin 38 after assembly.

In the wheel assembly's preferred embodiment, a third panel 74 is spaced from the second panel 42 by a second arcuate band 76. This second arcuate band 76 and third panel 74 form an enclosure for the hooks 66 of the axle pin 38. Thus, inadvertent disassembly is prevented, and the internal aesthetics of the container 20 are enhanced.

Figure 9:
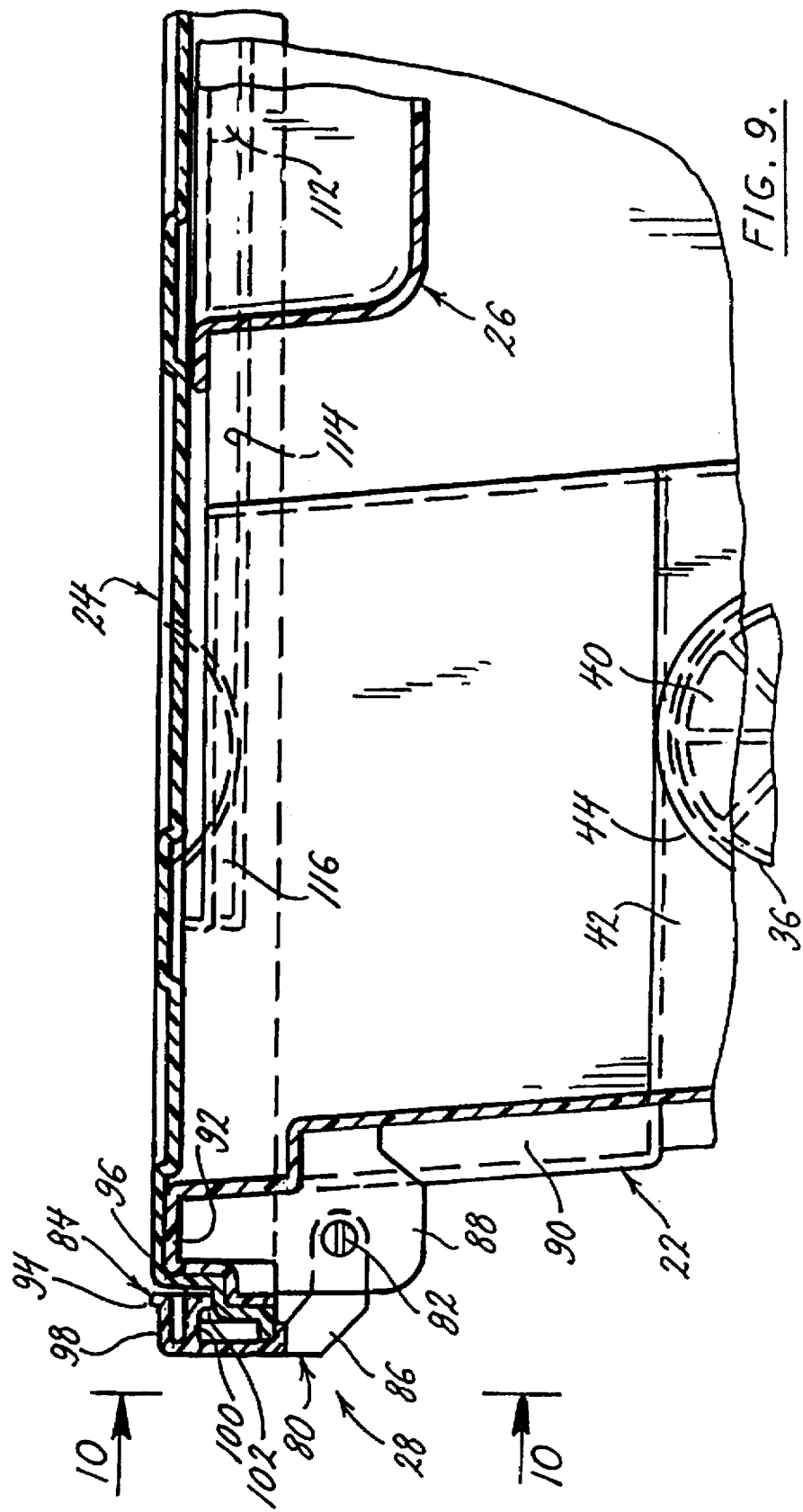
FIG. 9 is a section view of the storage container showing details of the latch.
Figure 10:
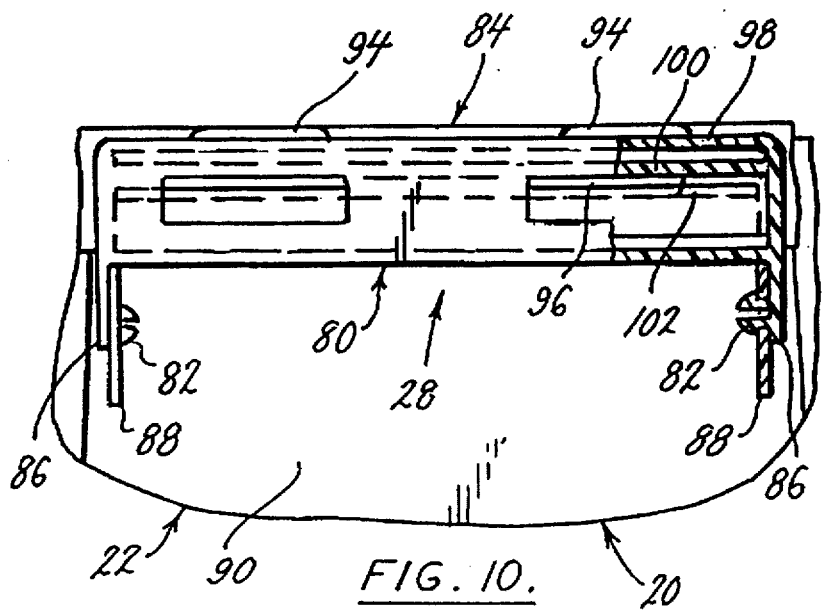
FIG. 10 is a detail view partially in section of the latch taken at the plane of line 10—10 of FIG. 9.
Figure 11:
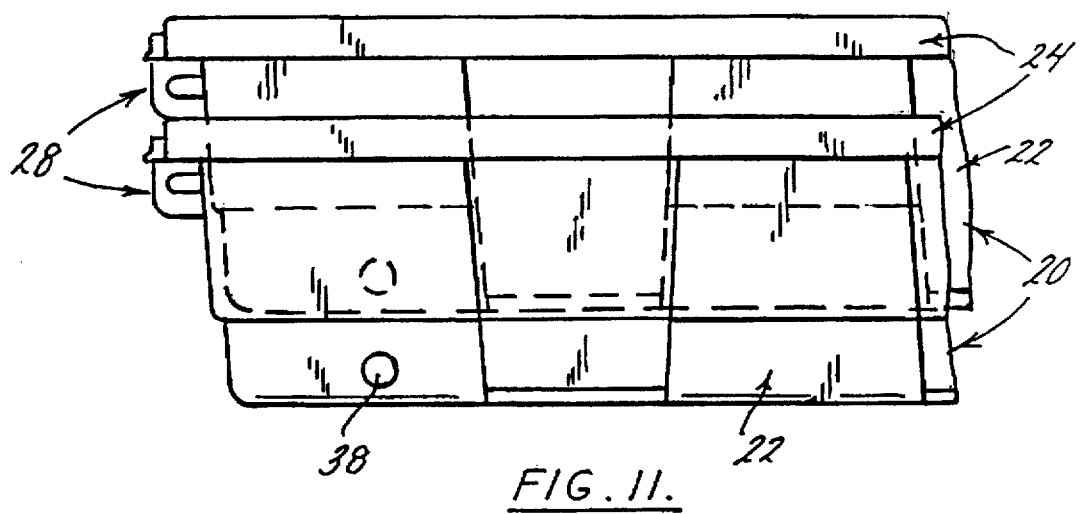
FIG. 11 is a front elevation view of two nested storage containers.
Figure 12:
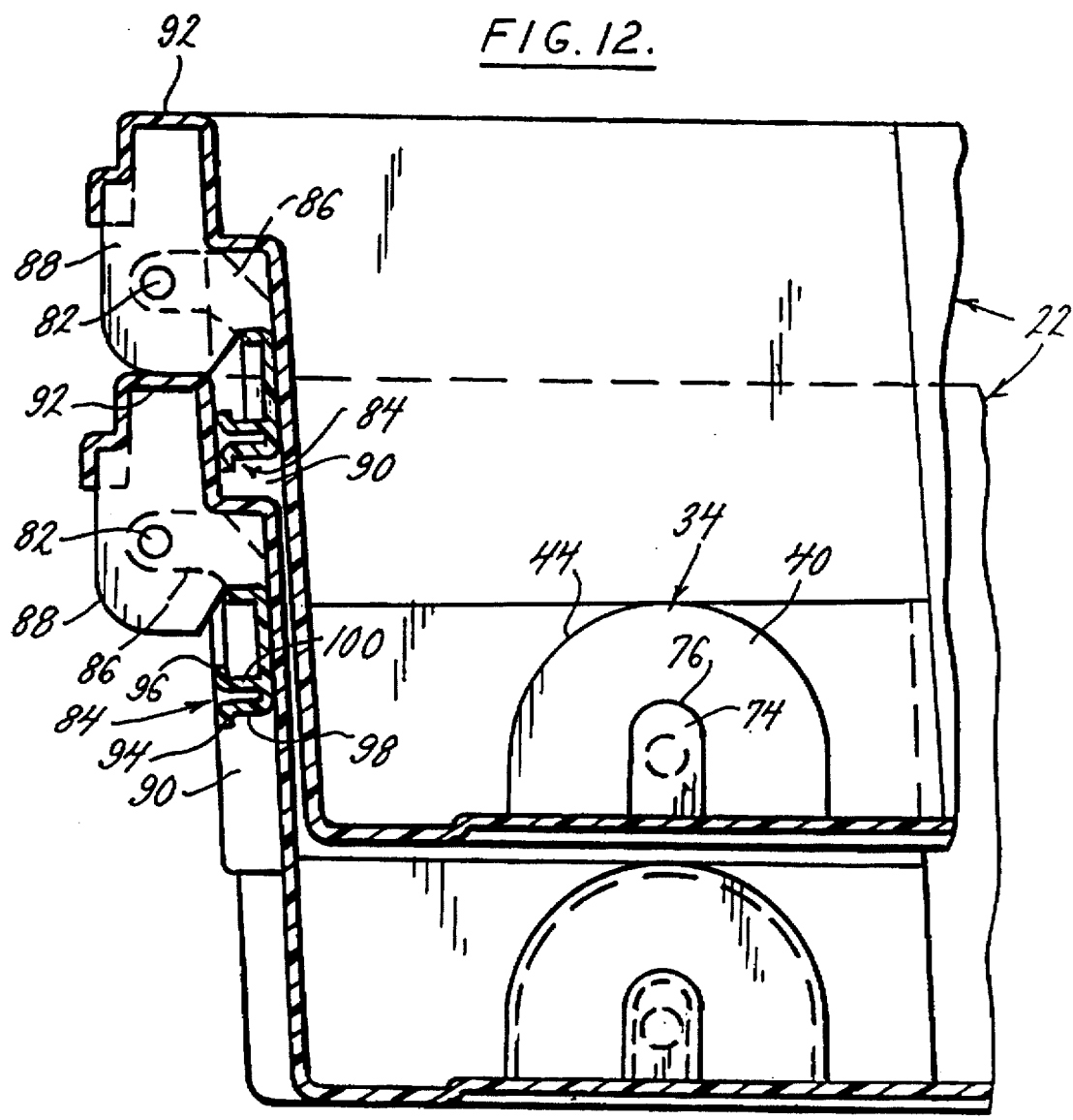
FIG. 12 is a section view of two nested storage containers showing the handles recessed into the containers.

As best seen in FIGS. 9 and 10, each latch 28 is comprised of a handle body 80, an offset hinge means 82, and a double-wall locking mechanism 84. The hinge means pivotally attaches the latch 28 to the box 22 and is offset from the handle as shown in FIG. 9 by arms 86 on the latch and ears 88 on the box so that when fully opened the handle body recesses into a concave portion or end recess 90 of the storage container as shown in FIG. 12. The handles may pivot downward within the recess 90 so that when nested as shown in FIGS. 11 and 12, the top box nests inside the bottom box with the bottom box extending upward, past the downward pivoted handles. In this way, the handles of the upper box are tucked inside the end walls of the lower box to protect the handles during shipment and storage. Thus, when the containers are nested, the handle bodies are not protruding outside the envelope of the storage containers, thereby reducing the possibility for handling damage in transport. The ears 88 extend downward so that when nested the ears of the upper box contact the top of the rim 92 of the lower box to prevent the nested boxes from becoming wedged together which would make separation difficult.

The double-wall locking mechanism is comprised of a gripping tab 94 and a detent 96 extending from two cantilever plates 98, 100 of the handle body 80. The gripping tab 94 extends vertically upward from the outer or cover plate 98 when in the closed position to aid in the opening of the latch mechanism. The detent 95 extends downward from the inner plate 100 in the closed position and engages with a mating ridge 102 molded into the lid 24. Thus, when snapped closed, the detent 96 and ridge 102 interfere to prevent inadvertent opening of the latch mechanism 28.

As shown in FIG. 4, the tray assembly 26 is generally comprised of a peripheral flange 110 and a pair of dependent flanges 112 extending downward from the peripheral flange on opposite sides of the tray. In the assembled condition, these dependent flanges 112 sit within tracks 114, outside of mating rails 116 molded into the walls of the storage container. These mating dependent flanges, tracks and rails prevent the walls of the container from displacing outward which would permit the tray to drop into the container. In the preferred embodiment, the rails are vertically recessed into the container away from rim 92 to permit full closure of the lid upon the storage container 10. In addition, the tracks 114 and rails 116 are longer than the tray 26, thereby permitting the tray to be slid along the rails for access to the bottom of the storage container without removing the tray.

While the present invention is described by reference to specific embodiments, it should be understood that modifications and variations of the invention may be constructed without departing from the scope of the invention defined in the following claims.

What is claimed is:

1. A wheel assembly and container combination to improve the transportability of the container, the container having an interior, the wheel assembly comprising:

a first panel integral with said container;

an axle pin having first and second ends, said first end extending through and being removably attached to said first panel;

a roller having a hole extending axially therethrough, said roller being rotatably mounted on said pin through the hole;

a second panel integral with said container and spaced from said first panel, said roller being mounted between said first and second panels;

an integral enclosure defined by a third panel integral with said container and spaced from said first panel, said third panel being positioned on an opposite side of said first panel from said second panel, and the first end of said pin being positioned between said first panel and third panel, thereby isolating the first end of said pin from the contents of said container.

2. The wheel assembly of claim 1 wherein:

the first end of said pin has a substantially polygonal cross-section; and said first panel has a substantially polygonal aperture through which the first end of said pin extends to prevent relative rotation between said first panel and pin.

3. The wheel assembly of claim 1 wherein the first end of the axle pin has at least a partially polygonal cross section that prohibits rotation of the axle pin relative to the first panel when the pin is inserted through the first panel.

4. The wheel assembly of claim 1 wherein the first end of the axle pin is configured to snap fit to the first panel and prohibit axial movement of the pin relative to the first panel.

5. A wheel assembly and container combination to improve the transportability of the container, the container having an interior, the wheel assembly comprising:

a first panel integral with said container;

an axle pin having first and second ends, said first end extending through and being removably attached to said first panel;

a roller having a hole extending axially therethrough, said roller being rotatably mounted on said pin through the hole;

a second panel integral with said container and spaced from said first panel, said roller being mounted between said first and second panels;

the first end of said pin is forked to form a plurality of tines, each tine having a neck adjacent a hooked tip;

said first panel has an aperture having a size and shape approximately equal to the size and shape of the cross-section of said pin at the neck, said pin being inserted through the aperture so the neck is in the plane of said first panel, and said pin preventing removal and axial movement of the pin relative to the first panel by the hook tip interfering with said first panel.

6. The wheel assembly of claim 5 wherein the neck of the axle pin has at least a partially polygonal cross section that prohibits rotation of the axle pin relative to the first panel when the pin is inserted through the aperture of the first panel.

7. A wheel assembly and container combination to improve the transportability of the container, the container having an interior, the wheel assembly comprising:

a first panel integral with said container;

an axle pin having first and second ends, said first end having a polygonal cross-section, being removably attached to said first panel and prevented from axial movement relative to said first panel; and a roller having a hole extending axially therethrough, said roller being rotatably mounted on said pin through the hole;

said first panel having a substantially polygonal aperture through which the first end of said pin extends such that relative rotation between said first panel and said pin is prevented;

an integral enclosure defined by a third panel integral with said container and spaced from said first panel, said third panel being positioned on an opposite side of said first panel from said second panel, and the first end of said pin being positioned between said first panel and third panel, thereby isolating the first end of said pin from the contents of said container.

8. A wheel assembly and container combination to improve the transportability of the container, the container having an interior, the wheel assembly comprising:

a first panel integral with said container;

an axle pin having first and second ends, said first end having a polygonal cross-section, being removably attached to said first panel and prevented from axial movement relative to said first panel; and a roller having a hole extending axially therethrough, said roller being rotatably mounted on said pin through the hole;

said first panel having a substantially polygonal aperture through which the first end of said pin extends such that relative rotation between said first panel and said pin is prevented;

the first end of said pin is forked to form a plurality of tines, each tine having a neck adjacent a hooked tip, said first panel having an aperture of a size and shape approximately equal to the size and shape of the cross-section of said pin at the neck, said pin being inserted through the aperture so the neck is in the plane of said first panel, and said pin being restricted from removal by the hooked tips interfering with said first panel.

9. The wheel assembly of claim 8 further comprising:

a second panel spaced from said first panel, said roller being mounted between said first and second panels, said second panel having an opening for receiving the second end of said axle pin and thereby providing radial retention and support of said pin.

10. A wheel assembly and container combination to improve the transportability of the container, the container having an interior, the wheel assembly comprising:

a first panel on the container;

an elongated axle pin having a center axis and opposite first and second ends, the first end being removably attached to the first panel, the axle pin including means for preventing rotation of the pin relative to the panel; and a roller having a width, a diameter and a centrally located hole, the roller being mounted for rotation on the pin; and an integral enclosure defined by a third panel integral with said container and spaced from said first panel, said third panel being positioned on an opposite side of said first panel as said second panel, and the first end of said pin being positioned between said first panel and third panel, thereby isolating the first end of said pin from the contents of said container.

11. The wheel assembly of claim 10 further comprising:

a second panel on the container and spaced from the first panel by a distance greater than the roller width, wherein the roller is mounted between the first and second panels.

12. The wheel assembly of claim 11 wherein:

the second panel has an opening configured to receive and support the second end of the axle pin.

13. The wheel assembly of claim 10 wherein:

the first end of the pin has a generally polygonal cross-section; and the panel has a generally polygonal aperture into which the first end of the pin extends preventing relative rotation between the first panel and pin.

14. A wheel assembly and container combination to improve the transportability of the container, the container having an interior, the wheel assembly comprising:

a first panel on the container;

an elongated axle pin having a center axis and opposite first and second ends, the first end being removably attached to the first panel, the axle pin including means for preventing rotation of the pin relative to the panel; and a roller having a width, a diameter and a centrally located hole, the roller being mounted for rotation on the pin;

the first end of the pin has a plurality of tines, each tine has a hooked tip and neck adjacent the hooked tip;

the first panel has an aperture;

the pin is inserted through the aperture so the tine necks are positioned within the aperture; and the pin is attached to the first panel by the hook tips engaging the panel when the pin is inserted through the aperture.

15. The wheel assembly of claim 14 wherein:

the axle pin is axially fixed with respect to the first panel.

16. The wheel assembly of claim 15 further comprising:

a second panel attached to the container and spaced from the first panel by a distance greater than the roller width, wherein the roller is mounted on the pin between the first and second panels, the second panel has an opening receiving the second end of the axle pin, wherein the axle pin includes a head adjacent the second end, the head being larger than the opening preventing the head from moving through the opening.

17. A wheel assembly and container combination to improve the transportability of the container, the container having an interior, the wheel assembly comprising:

a first panel integral with the container, the first panel having an aperture with a non-circular configuration;

an axle pin having a center axis and opposite first and second ends, the first end of the pin having a non-circular cross section that is complementary to the non-circular configuration of the first panel aperture and prohibits rotation of the pin relative to the first panel when inserted through the aperture of the first panel, the first end of the pin being configured to snap fit to the first panel and prohibit axial movement of the pin relative to the first panel when inserted through the aperture of the first panel; and, a circular roller having a central hole, the roller being mounted for rotation on the pin.

18. The wheel assembly and container combination of claim 17, wherein a second panel is integral with the container and spaced from the first panel, the roller being mounted between the first and second panels.

19. The wheel assembly and container combination of claim 18, further comprising an integral enclosure defined by a third panel integral with said container and spaced from said first panel, said third panel being positioned on an opposite side of the first panel relative to the second panel, and the first end of the pin being positioned between said first panel and third panel, thereby isolating the first end of the pin from the contents of the container.

20. The wheel assembly and container combination of claim 17 wherein the pin has at least a partially polygonal cross section.

21. The wheel assembly and container combination of claim 17 wherein the first end of the pin has a plurality of tines, each tine having a neck adjacent a hooked tip that engages with the first panel when the pin is inserted through the first panel.

22. The wheel assembly and container combination of claim 21 wherein the neck cross section is at least partially polygonal.

* * * * *